(12) United States Patent
Lavrencik

(10) Patent No.: US 7,290,759 B1
(45) Date of Patent: Nov. 6, 2007

(54) VIBRATION ISOLATION DAMPER FOR ELECTRONIC EQUIPMENT

(76) Inventor: Joe Lavrencik, 69 Windsor Dr., Oak Brook, IL (US) 60521

( * ) Notice: Subject to any disclaimer, the term of this patent is extended or adjusted under 35 U.S.C. 154(b) by 0 days.

(21) Appl. No.: 10/966,562

(22) Filed: Oct. 15, 2004

(51) Int. Cl.
F16M 11/00 (2006.01)

(52) U.S. Cl. ............... 267/140.2; 267/141.1; 267/140.11; 267/140.4

(58) Field of Classification Search ............ 267/136, 267/140.2, 141, 141.1, 141.2, 140.11, 140.4; 248/636, 638, 575, 576, 577, 578, 615, 621, 248/618, 619
See application file for complete search history.

(56) References Cited

U.S. PATENT DOCUMENTS

| 2,189,708 | A | * | 2/1940 | Coyne ............... 267/140.4 |
| 2,466,480 | A | * | 4/1949 | Rosenzweig ............ 248/578 |
| 2,823,882 | A | * | 2/1958 | Ross ................. 248/578 |
| 3,499,255 | A |   | 3/1970 | Sweeney et al. |
| 4,687,173 | A |   | 8/1987 | Genna |
| 4,744,539 | A | * | 5/1988 | Stimeling ............ 248/638 |
| 5,197,707 | A |   | 3/1993 | Kohan |
| 5,240,221 | A |   | 8/1993 | Thomasen |
| 5,390,892 | A | * | 2/1995 | Platus .............. 248/638 |
| 5,485,053 | A |   | 1/1996 | Baz |
| 5,667,202 | A | * | 9/1997 | Gwinn .............. 267/140.4 |
| 5,758,861 | A | * | 6/1998 | Feldhaus ............ 248/638 |
| 5,842,686 | A | * | 12/1998 | Hansen et al. ........ 267/140 |
| 5,945,643 | A |   | 8/1999 | Casser |
| 6,056,381 | A |   | 5/2000 | Turner |
| 6,279,679 | B1 |  | 8/2001 | Thomasen |

OTHER PUBLICATIONS

Sorbothane, Inc. Engineering Design Guide.

* cited by examiner

Primary Examiner—Thomas Williams
(74) Attorney, Agent, or Firm—Patnaude & Videbeck

(57) ABSTRACT

A vibration isolation platform utilizes a plurality of viscoelastic polymer blocks sandwiched between rigid plinths or boards and stacked on top of one another to provide vibration damping additively per layer of the sandwich. Smaller viscoelastic blocks are positioned between the edges of the plinths and the sidewalls of a framework in which the sandwich is mounted to compensate for lack of shear stress in the larger blocks. The platform is pre-loaded to optimum isolation and locked down at the required compression. Optimum isolation is achieved for any electronic component positioned on the platform up to the design weight limit.

6 Claims, 4 Drawing Sheets

VIBRATION ISOLATION DAMPER FOR ELECTRONIC EQUIPMENT

This invention relates to vibration damping equipment and, more specifically, an isolation platform for supporting consumer and commercial electronic apparatus and for damping vibrations from external sources to that equipment.

BACKGROUND OF THE INVENTION

Vibration damping equipment or apparatus takes on a number of forms, shapes, and sizes. Large industrial equipment, such as computer numerically controlled (CNC) machining or fabricating operations may be mounted on isolation platforms supported by gas filled bladders mounted between the platform and the bottom of a pit constructed in a factory. Such an isolation platform acts to protect sensitive equipment from vibrations emanating from adjacent machinery in the factory, or from outside sources such as heavy vehicles running on nearby roads and the like. Air bladders are ineffective in isolating consumer and commercial electronic because the high velocity of wave forms in the audible spectrum cause in the air bladder adiabatic compression which retain mechanical energy and passes vibration to the electronic component.

On a different size level, electronic equipment for both home use and for commercial use in recording studios in audio and visual recording, in television and radio studios and computer and other electronic facilities can benefit from being mounted on vibration isolation platforms. It is useful, and often necessary to provide vibration damping apparatus in order to provide high quality generation transmission and reception of electronic signals.

One such isolation platform is found in U.S. Pat. No. 5,197,707. This platform includes an open top rectangular box having a granular medium positioned therein with a plinth or top plate floating on the granular medium to isolate vibrations. The problems associated with not having the granular medium fully enclosed would allow such granules to escape.

A selectively tuned vibration absorber is shown in U.S. Pat. No. 6,279,679. In operation, a pair of these vibration absorbers are adapted to be mounted in spaced position on a plate that is affixed at its center to the back of a loudspeaker. Each apparatus includes a plurality of plates with small end spacers positioned between the plates at the opposing ends along the opposing end edges thereof. This apparatus is sized to be tuned to resonate at the fundamental resonance frequency of the low frequency loudspeaker. As such, it does not absorb vibrations from outside the piece of electronic equipment.

Additionally, a viscoelastic damping system is shown in U.S. Pat. No. 5,240,221. This system also is made up of a plurality of plates stacked together and separated with spacers. It is also meant to be mounted on an enclosure panel of a loudspeaker to attenuate the vibrations of the panel that may interfere with the desired loudspeaker output. In this patent, there is no disclosure of means for isolating the bolt (4) from the mounting block of the damping system.

Further, the cabinets of electronic equipment include, at times, spring mounted mounting pads having rubber or other elastic material on their bottom to isolate electronic equipment positioned in the cabinetry from outside vibrations. Springs are ineffective for isolating consumer and commercial electronics because springs store energy and excess mechanical energy is transferred to the electronic component as vibration. These isolation materials are exposed to airborne vibrations. These airborne mechanical disturbances cause the isolation materials to vibrate the electronic component.

A need has developed for an improved vibration isolation and damping apparatus or platform that provides superior vibration damping capabilities for home, commercial and industrial electronic equipment.

Another object of the present invention is the provision of an improved vibration damping apparatus or platform having lighter weight and less vibrating mass than heretofore known vibration damping apparatus. Another object of the present inventions is an isolation apparatus that isolates the internal isolation system from airborne vibration through an external double wall encasement.

It is therefore an object of the present invention, generally stated, to provide an improved vibration damping apparatus or platform for home, commercial and industrial electronic equipment.

Another object of the present invention is the provision of an improved vibration isolation or damping platform that lowers the resonant frequency of the upper portion of the platform to provide superior vibration isolation for electronic equipment mounted on such plinth or platform. Another object of the present invention is the inclusion of horizontally placed intermediate plinths between multiple isolation layers of polymers which diffuse residual energy passing through the viscoelastic material outward acting to dissipate vibration before reaching the next level of polymers.

SUMMARY OF THE INVENTION

The invention resides in an apparatus including a vibration damping plinth for isolating equipment positioned on the plinth from external vibration. The apparatus comprises a hollow framework including a bottom and sides extending upwardly from the bottom. At least one viscoelastic member is positioned on the hollow framework bottom. A top plinth is positioned on top of the at least one viscoelastic member in spatial relation to the sides of the apparatus. Additionally, the at least one viscoelastic member is compressed a predetermined amount corresponding to a weight greater than the weight of equipment to be positioned on top of the plinth.

BRIEF DESCRIPTION OF THE PREFERRED EMBODIMENTS

The features of the present invention which are believed to be novel are set forth with particularity in the appended claims. The invention may best be understood by reference to the following description taken in conjunction with the accompanying drawings in which like numerals refer to like parts and in which:

Figure 4:
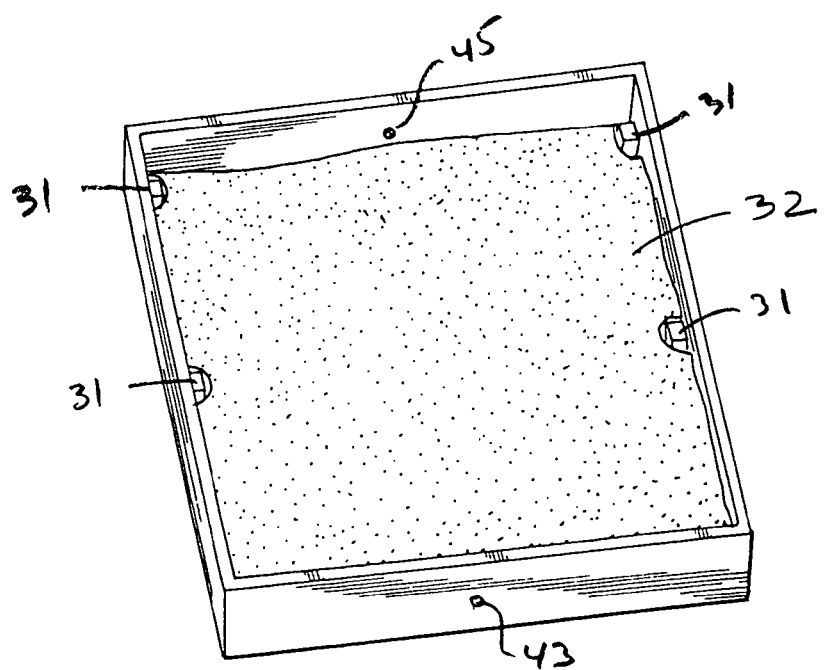
FIG. 4 is a perspective view similar to that of FIG. 3 showing the bottom layer of viscoelastic blocks positioned therein with sound deadening material positioned therebetween.
Figure 7:
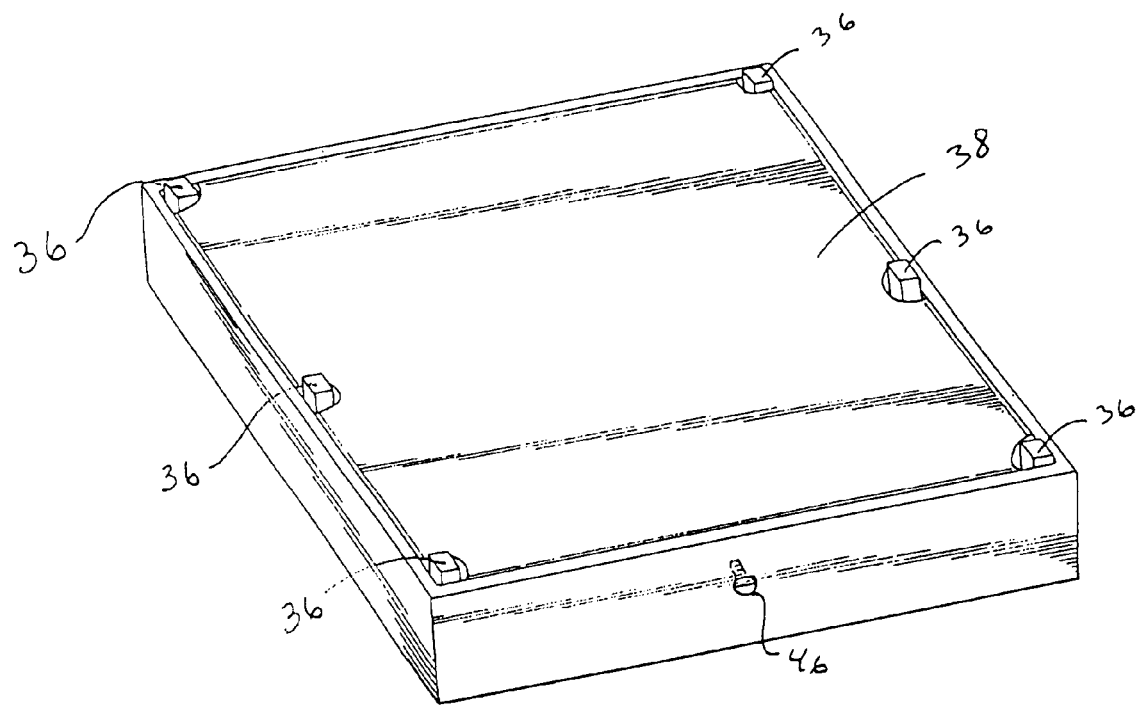
Figure 8:
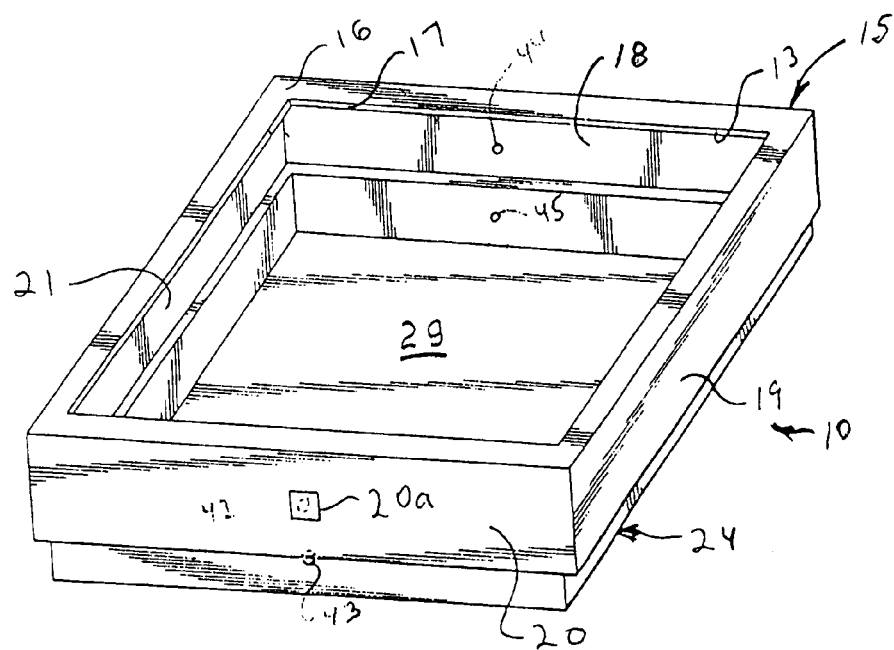

FIG. 7 is a ¾ top perspective view similar to FIG. 4 showing the viscoelastic blocks in mounted position on a plinth above the base of the container and having an additional sound deadening material positioned on the intermediate plinth; and FIG. 8 is a top ¾ perspective view of the base container having the outer cover positioned thereon with the plinths and isolation blocks normally positioned therein removed.

DETAILED DESCRIPTION OF THE PREFERRED EMBODIMENTS

Figure 1:
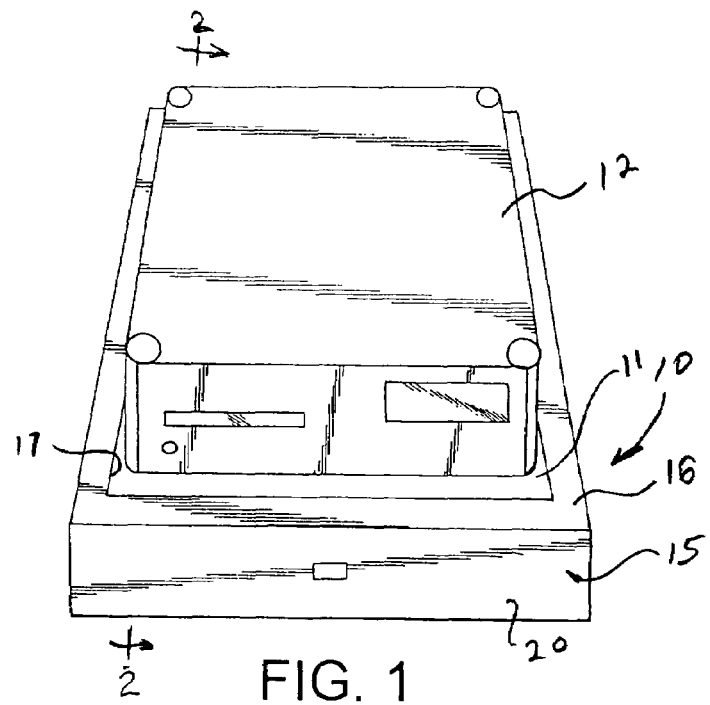
FIG. 1 is a ¾ top perspective view of an isolation platform constructed in accordance with the present invention having an electronic component positioned on the top thereof.
Figure 2:
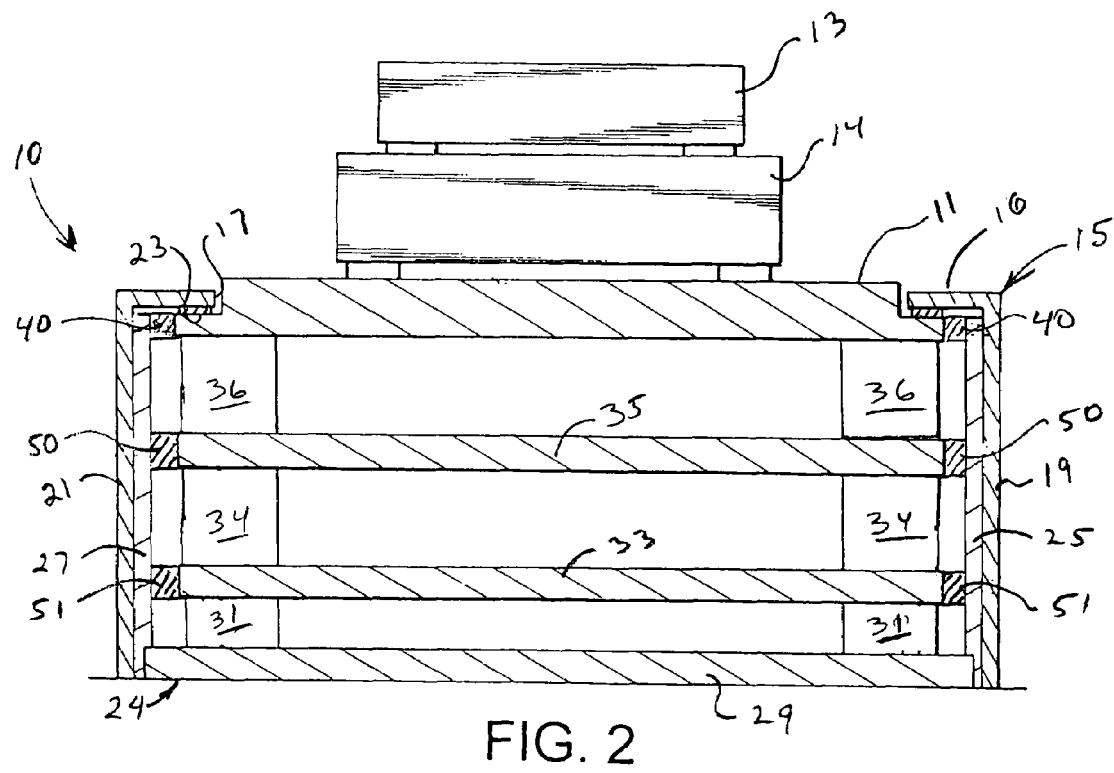
FIG. 2 is a detailed fragmented cross-sectional view taken along line 2-2 of FIG. 1, of the isolation platform of the present invention showing two differing stacked electronic components positioned thereon.

Referring to FIGS. 1, 2 and 8, the vibration isolating platform, generally indicated at 10, includes a top plinth or platform 11 on which an electrical component, be it large 12 (FIG. 1), a pair of smaller 13-14 (FIG. 2) components positioned on top of one another, or the like. Further the footprint of the platform may be any shape that accommodates positioning electronic equipment thereon. In addition to the upper plinth or platform 11, the portions of the isolation platform which can be seen readily include a surround type cover, generally indicated at 15 that includes in this embodiment, a hollow generally flat upper lip 16 having a rectangular internal edge 17 that surrounds the upper plinth 11 in spatially related picture frame type relation, and four vertical side walls 18, 19, 20 and 21 which, in this embodiment is rectangular and depends from the outermost portion of the upper lip 16. The rectangle on the front of side 20 is a logo showing a brand identification for the isolation platform of the invention 10 and covers a fastener to be discussed in more detail below. The top plinth 11 and top cover 15 are separated by a gasket 23 approximately ⅛×¼ inch cross-sections made of viscoelastic polymer, that extends around the length of edge 17 under the lip 16.

Figure 3:
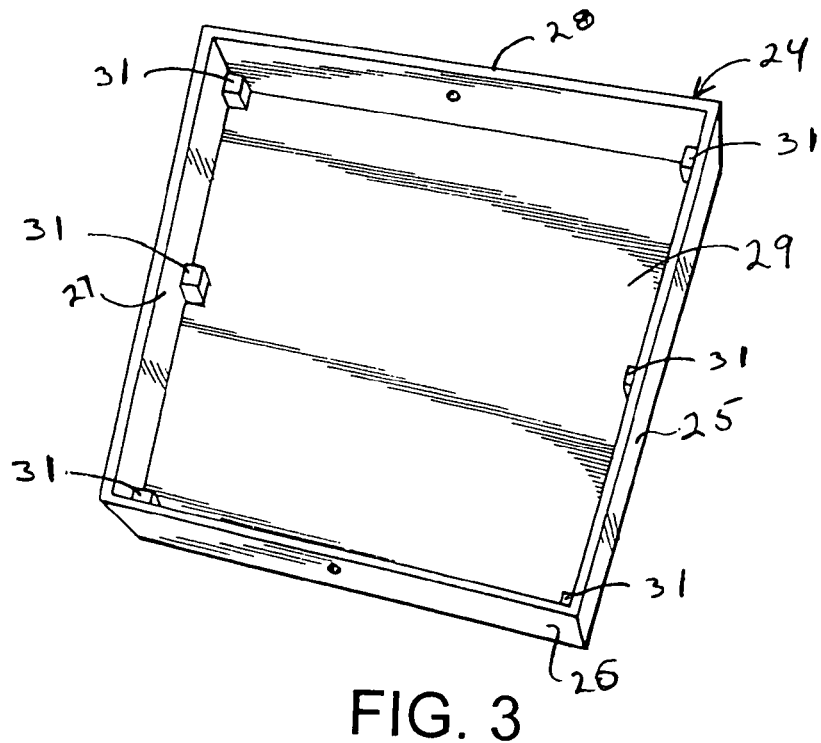
FIG. 3 is a ¾ top perspective view showing the base of the container in which the isolation platform is mounted having a first layer of viscoelastic blocks positioned on the bottom panel thereof.

Referring to FIGS. 3 and 8, the base or framework, generally indicated at 24, includes four vertical sides 25, 26, 27 and 28 fitted together at their respective ends to form a rectangular hollow box that is semi-enclosed by a rectangular bottom panel 29. The side and bottom panels may be constructed of any suitable material, plywood, solid wood boarding, particle board (MDP) or the like. As shown most clearly in FIG. 2, bottom panel 29 is joined to the sides 24, 25, 26, 27 and 28 by a rabbit type joint. If expansion and contraction are a concern, the bottom panel 29 can be lifted slightly and set into a dado slot in each bottom panel allowing expansion and contraction.

As shown most clearly in FIG. 8, the hollow cover 15 is slidably retained on the base framework 24 in a vertical sliding relation thereover the retention of the cover on the base will be discussed in greater detail below.

Referring to FIG. 2, the vibration damping material positioned under the top plinth 11 and within the confines of the base framework 24 are shown. The interior members shown in FIG. 2 are not necessarily drawn to scale but indicate the relationship between the parts making up the absorption damping or isolation platform 10. As shown most clearly in FIGS. 2 and 3, on top of the bottom panel 29 are mounted a plurality of vibration damping blocks, 31-31. In the preferred embodiment, these vibration damping blocks are made of a highly elastic material and are 1 inch by 1 inch in footprint. In the embodiment shown in FIG. 2, the height of the various viscoelastic polymer blocks is shown differing from layer to layer. They may be the same height in the various layers underneath the top plinth 11, as dictated by the frequencies to be damped. 1.25 inches is a standard height in the preferred embodiment. The viscoelastic material making up these blocks are manufactured by I.E. DuPont, B. P. Amoco, General Electric, and Trelleborg A. B. Material sold under the brand Sorbothane may be used or E. A. R. Specialty Composites.

In the embodiment shown in FIG. 3, six of these viscoelastic polymer blocks are mounted adjacent but spaced about ½ inch from the corners of the base framework 24 and also positioned midway between the corner blocks on two opposing sides of the base framework for a total of six viscoelastic polymer blocks. In the preferred embodiment Sorbethane brand polymer is used. As will be shown in more detail below, the number and size and spatial relation of the viscoelastic polymer block may be changed depending upon the vibration damping characteristics one wishes to have in the apparatus. FIG. 2 shows the spatial relation between each of the viscoelastic blocks 31 and the sides 25-27 of the base framework 24.

As shown most clearly in FIG. 4, sound deadening or insulation material 32 is positioned between the viscoelastic polymer blocks to fill the space between the bottom panel 29 and an intermediate plinth 33. Intermediate plinth 33 is adhered to the top of viscoelastic polymer blocks 31-31 and is rectangular in shape similar to the bottom panel 29, but slightly smaller (about ½ inch in side length) to allow a ¼ inch spatial relation between the side edges of the intermediate plinth 33 and the side walls 25, 26, 27, 28 of the base framework 24.

Intermediate plate 33 may be made of wood, metal, carbon fiber, or synthetic material. On top of the first intermediate plinth or plate 33 immediately above the viscoelastic polymer blocks 31-31 are adhered an additional six viscoelastic polymer blocks 34-34. Viscoelastic polymer blocks 34-34 are in this embodiment, also 1 inch by 1 inch square by 1.25 inches high, although those dimensions may be changed within the scope of the invention.

A second intermediate plinth or plate 35 is adhered at its ends to the tops of the respective viscoelastic polymer blocks 34, 34 in the same manner that first intermediate plinth 33 is adhered to blocks 31-31. Additionally, another layer of sound deadening or insulation material (not shown) is also positioned between the first intermediate plinth 33 and the second intermediate plinth 35 with the same purposes as the first layer 32.

Second intermediate plinth 35 may be shaped identically to the first intermediate plinth 33 and be made of the same or differing material. On top of the second intermediate plinth 35 and positioned between that plinth and the upper plinth 11, are six additional viscoelastic polymer blocks 36-36 which may be shaped identically to blocks 34 and 31 or different from them depending upon the design goals of the isolation platform.

As shown most clearly in FIG. 7, a layer of sound deadening material 38 is positioned within the viscoelastic polymer blocks 36-36 and between the second intermediate plinth 35 and the top plinth 11.

Figure 5:
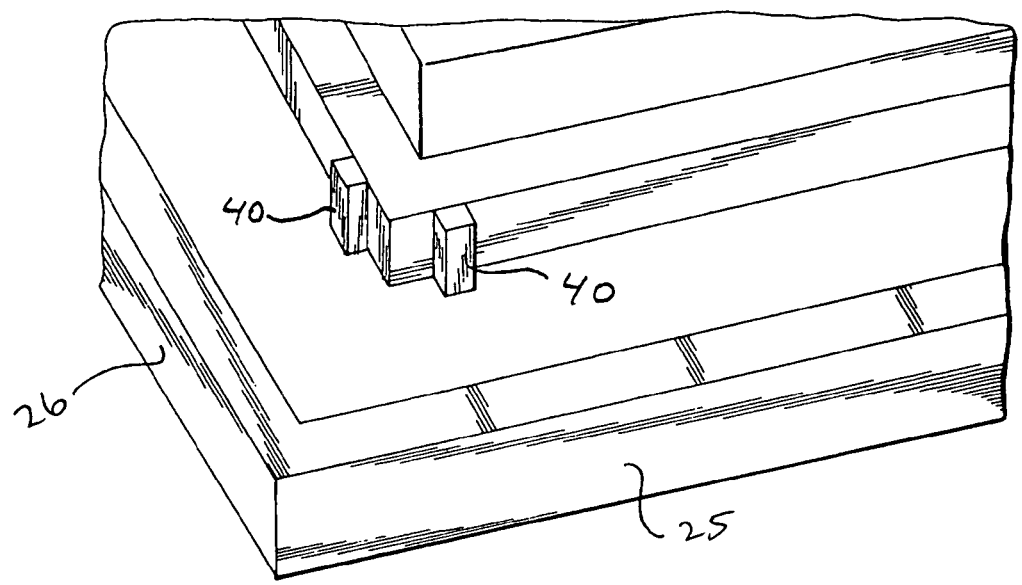
FIG. 5 is a fragmentary perspective view of one corner of the top plinth of a vibration isolation damping apparatus showing the viscoelastic blocks positioned on the side thereof prior to positioning the plinth within the base container.
Figure 6:
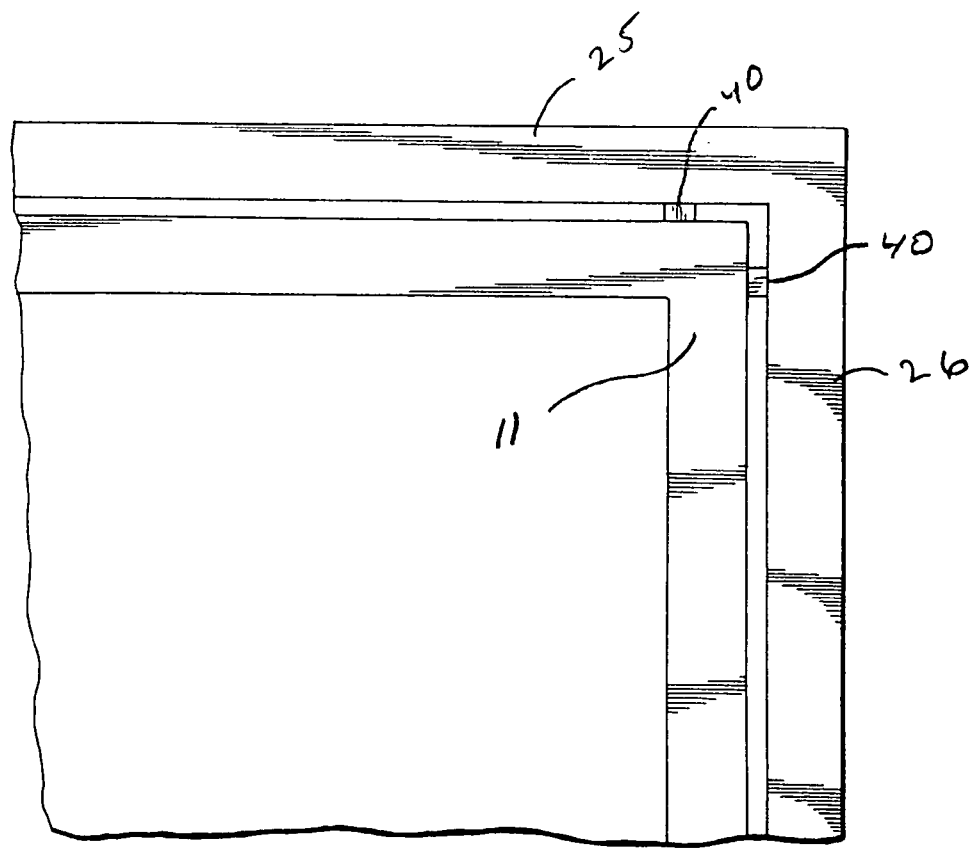
FIG. 6 is a fragmentary top plan view of one corner of the base container for the vibration isolation platform showing the top plinth mounted therein.

While the stacked plinths 11, 33 and 35 are connected by the viscoelastic blocks 36-36, 34-34, and 31-31 respectively, additional smaller viscoelastic blocks 40-40 are positioned between the edges of the top plinth 11 and the inside top of the framework vertical sides 25, 26, 27 and 28. Smaller blocks 50-50 and 51-51 are positioned between the edges of the second and first intermediate plinths, respectively, and the sides 25-28 of the framework 24. Referring to FIGS. 2, 5 and 6, the elastoviscous blocks 40-40, 50-50 and 51-51, are, in this embodiment approximately ⅜ inch by ⅜ inch by ¾ inch high. These viscoelastic blocks 40-40, 50-50 and 51-51 compress sideways in a manner similar to the vertical compression of viscoelastic blocks 31-31, 34-34 and 36-36 to further isolate each of the plinths or platforms from the base framework 24 and exterior airborne vibration. Blocks 40-40 compensate for a low shear strength of the viscoelastic blocks 31-31, 34-34 and 36-36. These blocks together with the viscoelastic polymer gasket 23 positioned on the inside of the top lip 16 of cover 15 completely isolate the upper plinth 11 from the remainder of the isolation platform 10. Heretofore known isolations platforms have used damping material to fill the container or pit on which the platform is mounted. By using a material closer to the high end of the 30-80 "00" scale durometer reading, less total damping material may be utilized and greater isolation attained due to lowered natural frequency and reduced physical contact between shelves. Also the hollow sandwich type construction using rigid intermediate plinths provides added structural integrity to the upper plinth than previously known.

In one important aspect of the present invention, behind the rectangular logo 20a adhered to the front side 20 of cover 15, threaded holes 42, 43 on the front side of the vibration damper and 44, 45 on the backside of the vibration damper are adapted to receive a screw such as shown at 46 in FIG. 7 to maintain the plinths 11, 33 and 35 and the respective viscoelastic blocks 31-31, 34-34 and 36-36 in a predetermined compressed state, in this embodiment 20 percent compression of the viscoelastic blocks 31-31, 34-34 and 36-36. With the plinth and blocks compressed the predetermined amount, the holes 42, 43 and 44, 45 are, in this embodiment, drilled and die cut into the cover 15 and the base 24. Then a pair of screws 46-46 (one shown) are threaded into the mating holes to pre-compress the vibration damping components of the damper 10. As a result of the pre-compressing of the viscoelastic blocks 31-31, 34-34 and 36-36, the upper plinth 11 is already lowered to a position equating the maximum weight or optimum weight the vibration damper 10 can handle on top of the plinth 11. It has been found that with the viscoelastic blocks 31-31, 34-34 and 36-36 compressed to their optimal damping dimension (in this case 20 percent compressed) that the addition of electronic components such as shown at 12, 13 and 14 through the top of plinth 11, as long as they are below the weight resulting in optimum compression, do not additionally compress the viscoelastic blocks 31-31, 34-34 and 36-36. In other words, from a vibration damping point of view, the viscoelastic blocks support the electronic components such as 11, 12 and 13 as though the gravity pulling on those components did not exist. If the vibration damper 10 of the invention is designed and constructed for a deflection that would equal an 80 pound electronic component on the top of plinth 11, if one puts an electronic component weighting less than 80 pounds (perhaps up to 60 pounds with a safety factor built in) the polymer acts as though it the electronic component is not there. So, by precompressing the vibration damper 10 of the invention, the self-contained system works at optimal efficiency for any and all appropriately dimensioned electronic components up to the designed limit load.

The engineering done to determine the size and number of viscoelastic pads or blocks 31-31, 34-34, and 36-36 is known in the art. Such viscoelastic blocks may have a hardness ranging from 30 to 80 on the Shore "00" scale. It is standard to design isolators in a linear region of the load vs. deflection curves for the material which is nominally between 10 and 20 percent deflection. While rectangular blocks are shown in the instant embodiment, other shapes and sizes of viscoelastic material may be utilized. Shape factors in existing equations for determining the size and number of viscoelastic blocks to be used include rectangles, squares, discs and tubes. Such products also disclose natural frequencies of vibration of those products. The quality of transmissibility is defined as a frequency ratio which equals the excitation frequency over the system's natural frequency and the percent of isolation is equal to 1 minus the transmissibility times 100. The percent deflection is equal to the static deflection over the height of the block times 100. Inputting these figures into known equations allows the determination of the transmissibility and percent isolation of the product to be placed on top of the plinth. In one important aspect of the present invention, heretofore known vibration damping equipment for electronic components has utilized a single layer of solid viscoelastic material. The material is sized, shaped and of a diameter such that the material will fill a container or recess on which the plinth is mounted. Using a sheet of viscoelastic material results in low deflection and little or no isolation of the component. The polymer must be deflected to exactly 20 percent to attain 93 or 94 percent vibration damping. As one example, the viscoelastic block utilized may itself provide 93 or 94 percent vibration damping in the first layer or on top of the first intermediate plinth 33. By utilizing a plurality of viscoelastic blocks such as shown at 31-31 and then by adding a second layer of viscoelastic blocks such as shown at 34-34 added vibration damping per layer is obtained. In other words, the second layer of isolation blocks 34-34 also provide a 93 percent vibration damping on top of the 93 percent obtained on the first layer thereof. The addition of a third layer of viscoelastic blocks 36-36 provides an additive 93 percent vibration damping which makes the overall damping factor above 99 percent.

Thus, a new and improved apparatus for isolating vibration from outside sources to electronic components has been shown and described.

While one embodiment of the present invention has been shown and described, it will be apparent to those skilled in the art that many changes and modifications may be made without departing from the true spirit and scope of the present invention. It is the intent of the appended claims to cover all such changes and modifications which fall within the true spirit and scope of the invention.

What is claimed is:

1. Apparatus including a vibration damping plinth for isolating equipment positioned on said plinth from external vibration in more than one plane, said apparatus comprising:
   a hollow framework including a bottom and sides extending upwardly from said bottom,
   at least two viscoelastic members laterally positioned in spaced relation on an inside of said hollow framework bottom,
   an intermediate plinth mounted on top of said at least two viscoelastic members and in spaced relation to said sides of said hollow framework,
   at least two additional viscoelastic members positioned in spaced relation on top of said intermediate plinth,
   a top plinth positioned on top of said at least two additional viscoelastic members in spatial relation to said sides of said apparatus, said top plinth having a substantially flat top surface and being sized to accept an entire electronic component case thereon, and said at least two viscoelastic members being compressed in height substantially evenly across their top surfaces a predetermined amount corresponding to a weight greater than the weight of equipment to be positioned on top of said plinth.

2. The apparatus as defined in claim 1 further including, at least two small viscoelastic members mounted in spaced relation on each external edge of said top plinth and slidably retained by said sides of said hollow framework contiguously therewith for providing vibration isolation between said plinth and said sides of said hollow framework.

3. The apparatus as defined in claim 2 further including, a cover including a top having an aperture therethrough and a skirt extending downwardly from a circumference of said top, one of an underside of said top of said cover and an upwardly facing surface of said top plinth having a viscoelastic polymer gasket positioned thereon for providing vibration isolation of said cover from said top plinth.

4. A vibration isolation apparatus for providing a platform on which electronic equipment can be positioned and isolated from external vibration in more than one plane, said apparatus comprising, a framework including a bottom and sides extending upwardly from said bottom and having a hollow portion therein, a sandwich of viscoelastic polymer material and at least one intermediate plinth positioned in said hollow portion, said sandwich including a first plurality of viscoelastic members laterally positioned in spaced relation on an inside of said bottom of said framework, said at least one intermediate plinth positioned on top of said first plurality of viscoelastic members, a second plurality of viscoelastic members laterally positioned in spaced relation on top of said intermediate plinth, a platform positioned on top of said second plurality of viscoelastic members, said sandwich with said platform on top thereof is compressed a predetermined amount and maintained in said compressed condition, and said first and second plurality of spaced apart viscoelastic members being compressed substantially evenly in height across their lengths and widths.

5. The vibration isolation apparatus as defined in claim 4 further including, a cover having a top including a central aperture therethrough and a skirt extending downwardly from the circumference of said top.

6. Apparatus including a vibration damping plinth for isolating equipment positioned on said plinth from external vibration in more than one plane, said apparatus comprising:

a hollow framework including a bottom and sides extending upwardly from said bottom, at least two viscoelastic members laterally positioned in spaced relation on an inside of said hollow framework bottom, a top plinth positioned on top of said at least two viscoelastic members in spatial relation to said sides of said apparatus, and said at least two viscoelastic members being compressed in height substantially evenly across their top surfaces a predetermined amount corresponding to a weight greater than the weight of equipment to be positioned on top of said plinth, at least two small viscoelastic members mounted in spaced relation on each external edge of said top plinth and slidably retained by said sides of said hollow framework contiguously therewith for providing vibration isolation between said plinth and said sides of said hollow framework, a cover including a top having an aperture therethrough and a skirt extending downwardly from a circumference of said top, and one of an underside of said top of said cover and an upwardly facing surface of said top plinth having a viscoelastic polymer gasket positioned thereon for providing vibration isolation of said cover from said top plinth.

* * * * *